US011184945B2

United States Patent
Yi et al.

(10) Patent No.: US 11,184,945 B2
(45) Date of Patent: Nov. 23, 2021

(54) METHOD FOR HANDLING DEACTIVATION FOR A CELL IN WHICH PACKET DUPLICATION IS PERFORMED IN WIRELESS COMMUNICATION SYSTEM AND A DEVICE THEREFOR

(71) Applicant: LG ELECTRONICS INC., Seoul (KR)

(72) Inventors: Seungjune Yi, Seoul (KR); Sunyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 33 days.

(21) Appl. No.: 16/622,279

(22) PCT Filed: May 18, 2018

(86) PCT No.: PCT/KR2018/005727
§ 371 (c)(1),
(2) Date: Dec. 12, 2019

(87) PCT Pub. No.: WO2018/230849
PCT Pub. Date: Dec. 20, 2018

(65) Prior Publication Data
US 2020/0107392 A1    Apr. 2, 2020

Related U.S. Application Data

(60) Provisional application No. 62/519,186, filed on Jun. 14, 2017.

(51) Int. Cl.
*H04W 28/02* (2009.01)
*H04W 76/38* (2018.01)
(Continued)

(52) U.S. Cl.
CPC ............... *H04W 76/38* (2018.02); *H04L 1/22* (2013.01); *H04W 28/06* (2013.01); *H04W 76/34* (2018.02); *H04W 80/08* (2013.01)

(58) Field of Classification Search
None
See application file for complete search history.

(56) References Cited

U.S. PATENT DOCUMENTS

| 8,976,694 B2 | 3/2015 | Feuersanger et al. |
| 2013/0188473 A1 * | 7/2013 | Dinan ................ H04W 74/002 370/216 |

(Continued)

FOREIGN PATENT DOCUMENTS

| EP | 2827510 | 1/2015 |
| KR | 1020150018248 | 2/2015 |

OTHER PUBLICATIONS

PCT International Application No. PCT/KR2018/005727, Notification of Transmittal of The International Search Report and the Written Opinion of the International Searching Authority, or Declaration dated Aug. 24, 2018, 11 pages.

*Primary Examiner* — Ajit Patel
(74) *Attorney, Agent, or Firm* — Lee, Hong, Degerman, Kang & Waimey

(57) ABSTRACT

The present invention relates to a wireless communication system. More specifically, the present invention relates to a method and a device for handling deactivation for a cell in which packet duplication is performed in wireless communication system, the method comprising: receiving a duplication activation command for a radio bearer; starting to perform a data duplication for the radio bearer according to the duplication activation command; and disabling a deactivation timer for a cell associated with the radio bearer when the duplication activation command is received.

9 Claims, 12 Drawing Sheets

(51) Int. Cl.
  *H04W 76/34*   (2018.01)
  *H04L 1/22*    (2006.01)
  *H04W 28/06*   (2009.01)
  *H04W 80/08*   (2009.01)

(56) References Cited

U.S. PATENT DOCUMENTS

| | | |
|---|---|---|
| 2016/0044639 A1 | 2/2016 | Yi et al. |
| 2016/0315868 A1 | 10/2016 | Zhang et al. |
| 2018/0013520 A1* | 1/2018 | Chang .................. H04W 76/38 |
| 2018/0279264 A1* | 9/2018 | Shimezawa ............. H04L 5/001 |
| 2018/0309660 A1* | 10/2018 | Loehr ................... H04W 76/15 |
| 2018/0324641 A1* | 11/2018 | Tsai ...................... H04L 69/321 |
| 2018/0351705 A1* | 12/2018 | Uchino ............. H04W 52/0216 |
| 2020/0037151 A1* | 1/2020 | Du ............................ H04L 1/22 |

* cited by examiner

【Figure 1】
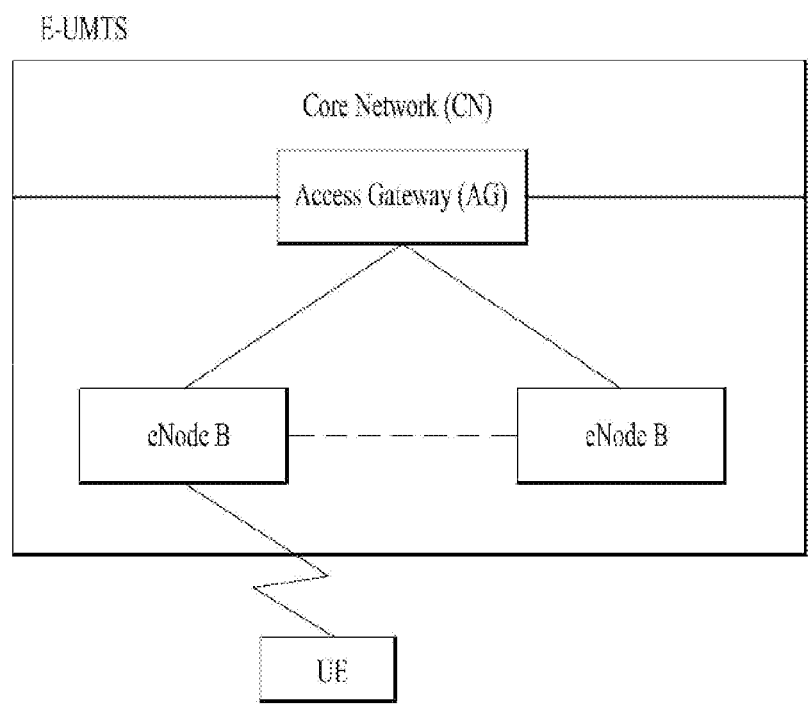

【Figure 2a】
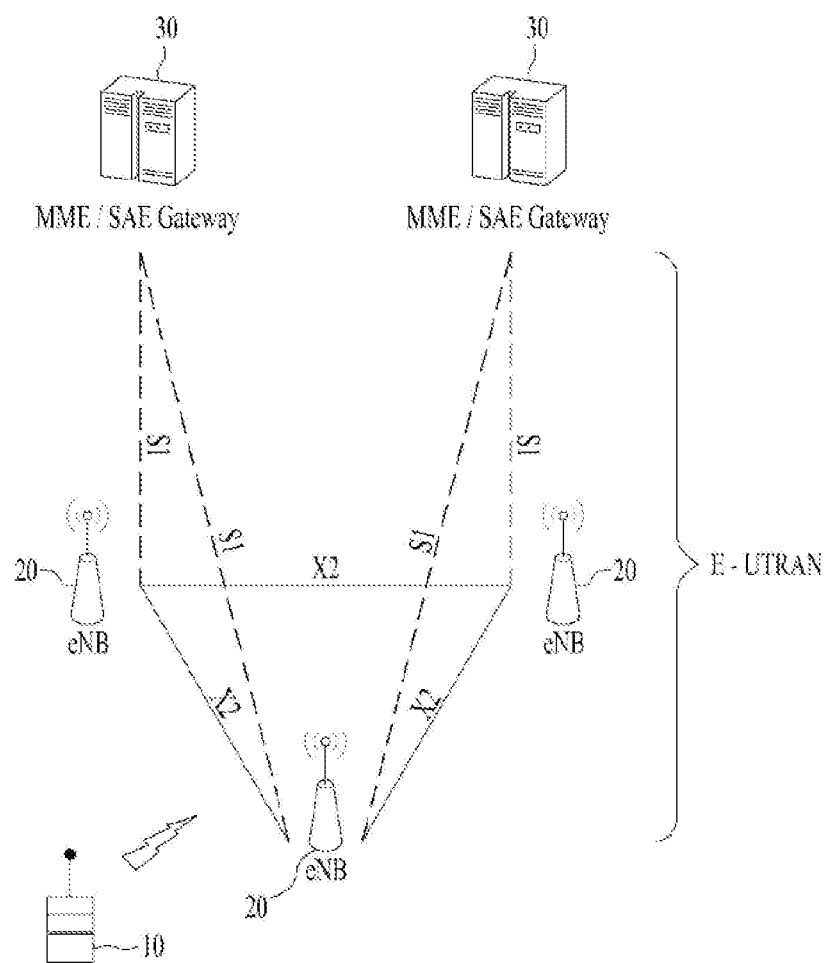

【Figure 2b】
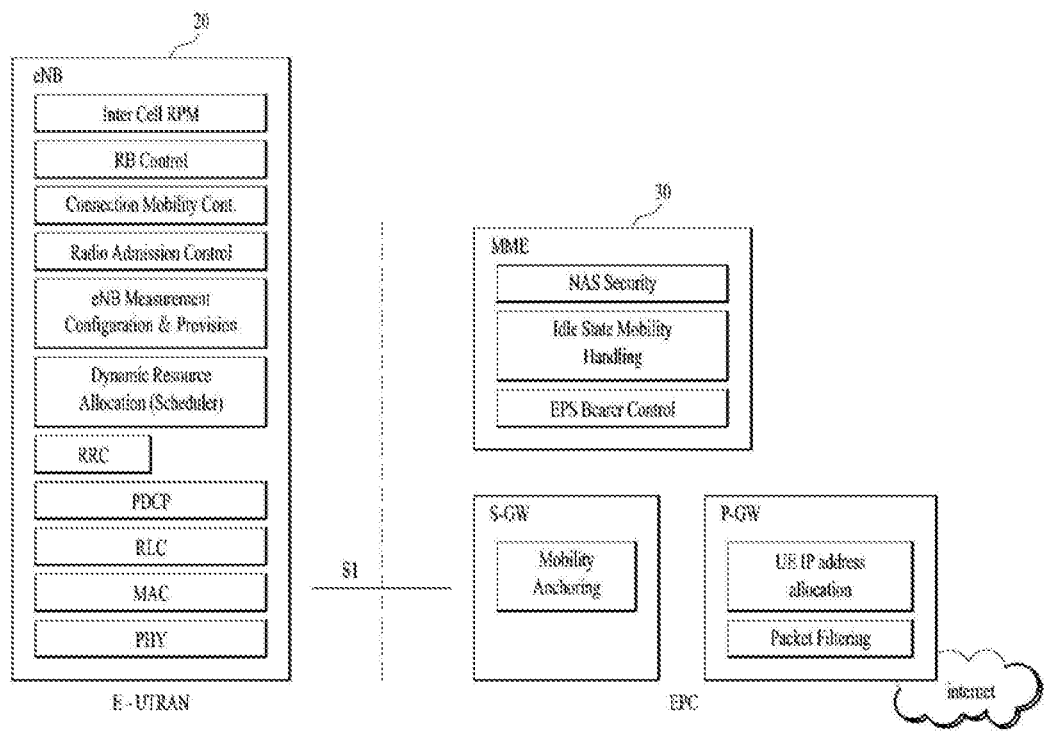

[Figure 3]
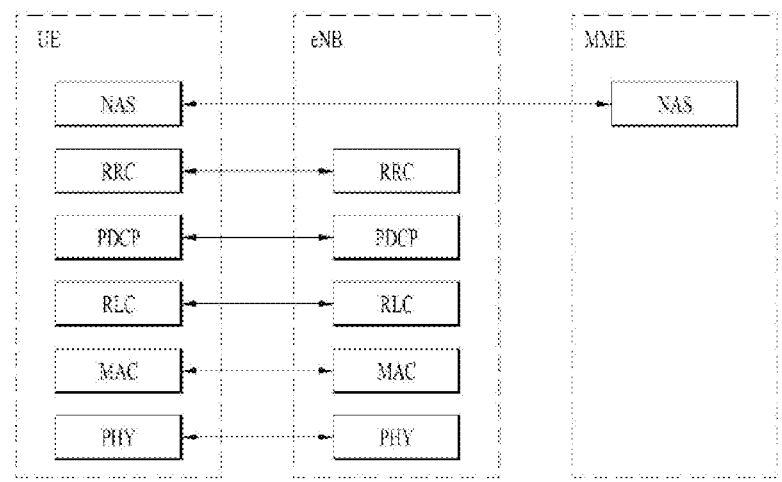
(a) Control-Plane Protocol Stack
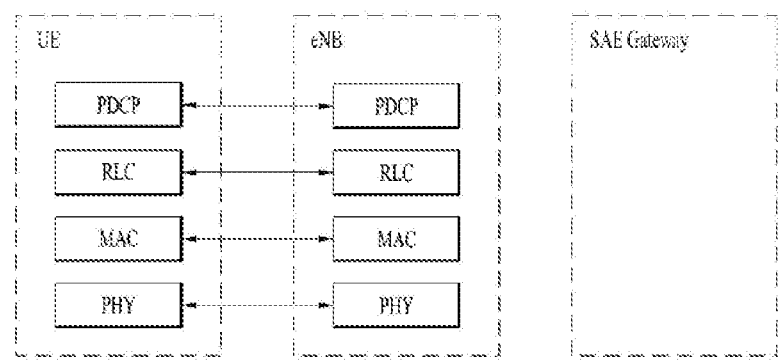
(b) User-Plane Protocol Stack

[Figure 4a]
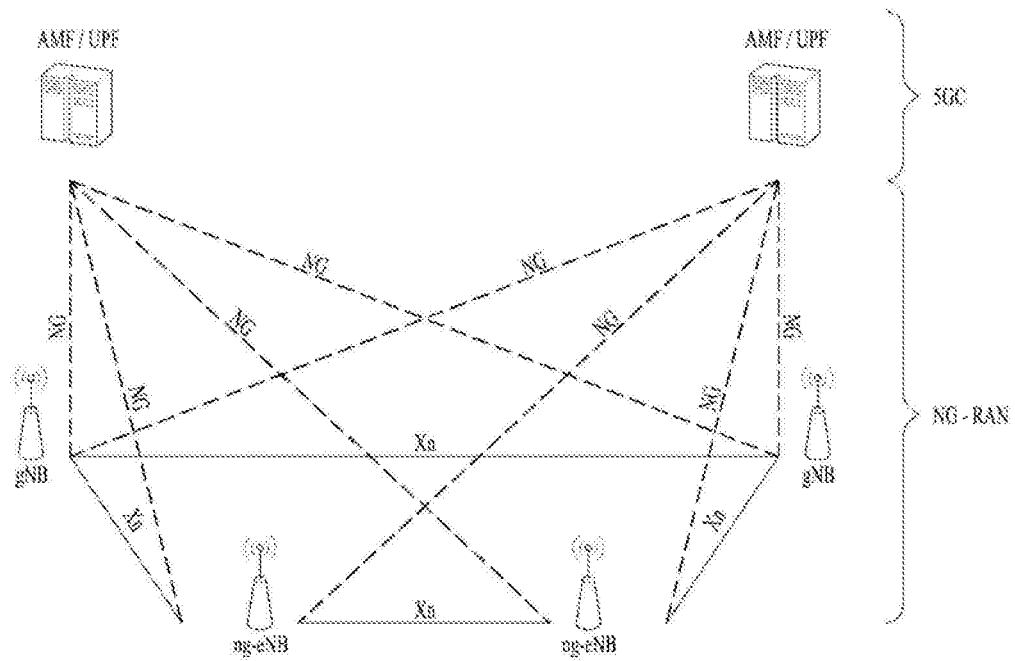

【Figure 4b】
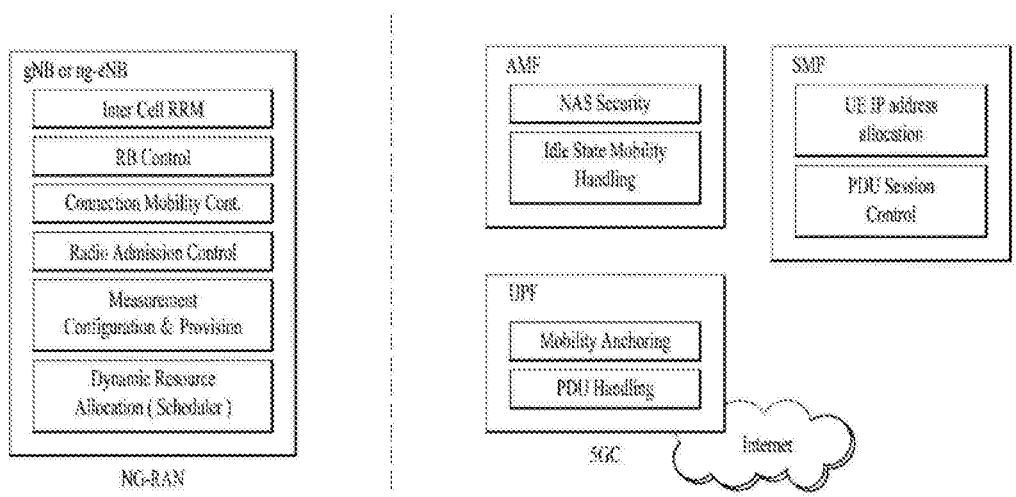

[Figure 5]
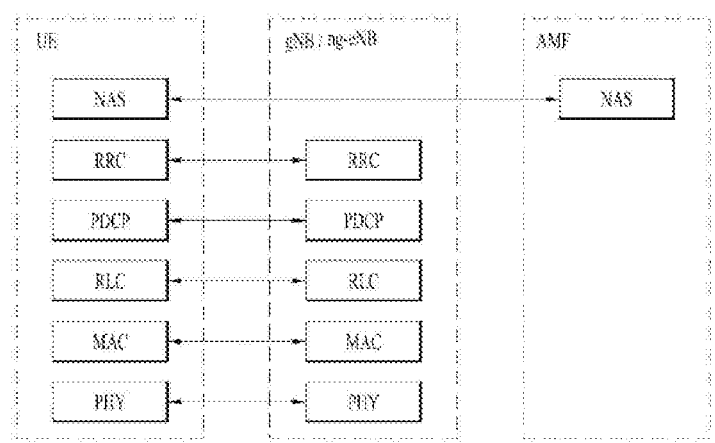
(a) Control-Plane Protocol Stack
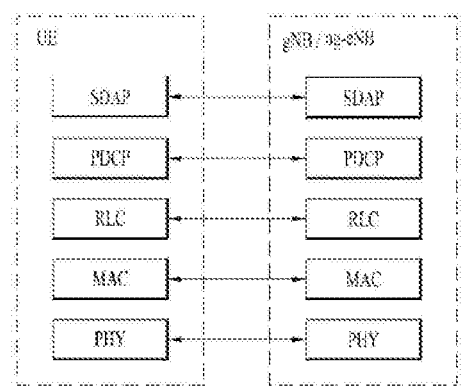
(b) User-Plane Protocol Stack 【Figure 6】
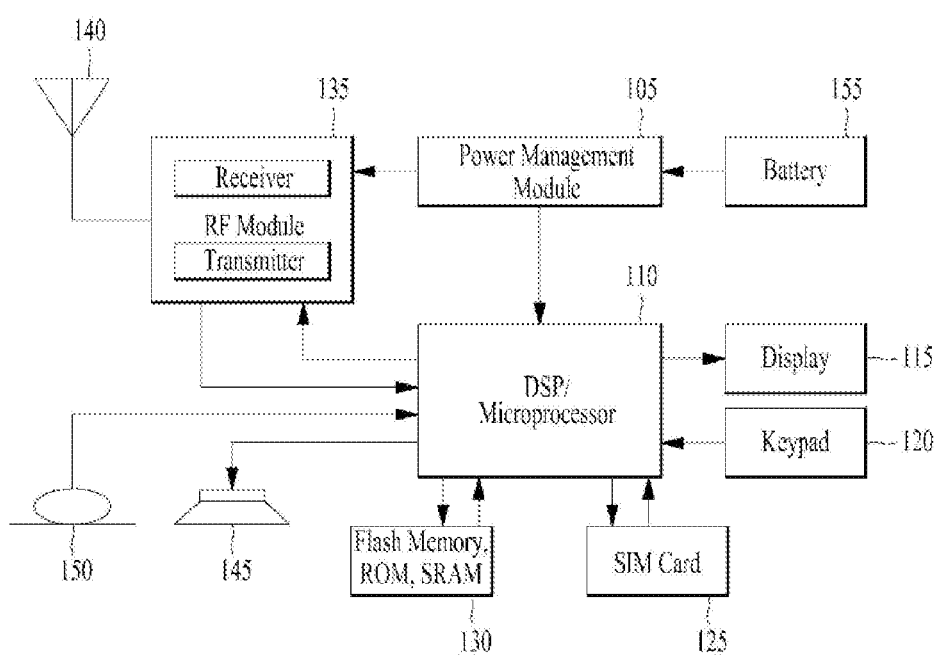

【Figure 7】
(a) Activation/Deactivation MAC control element of one octet
(b) Activation/Deactivation MAC control element of four octets
【Figure 8a】
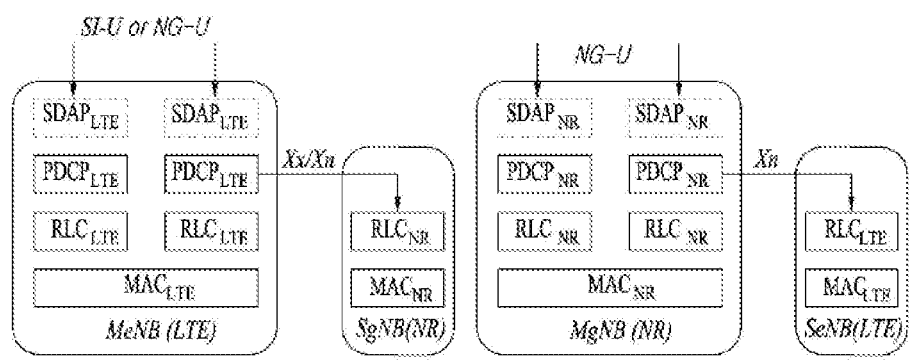

【Figure 8b】
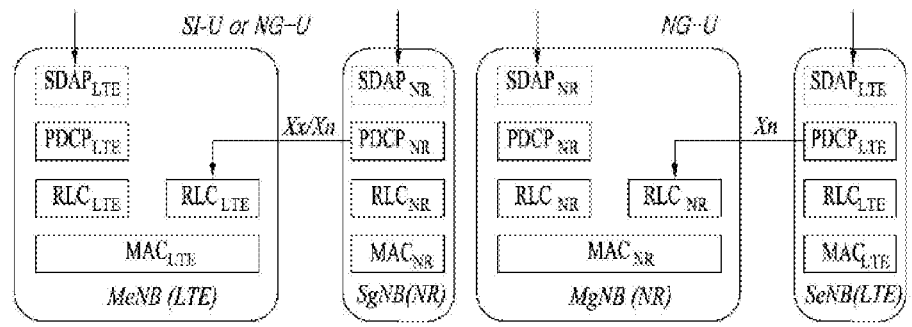
【Figure 8c】
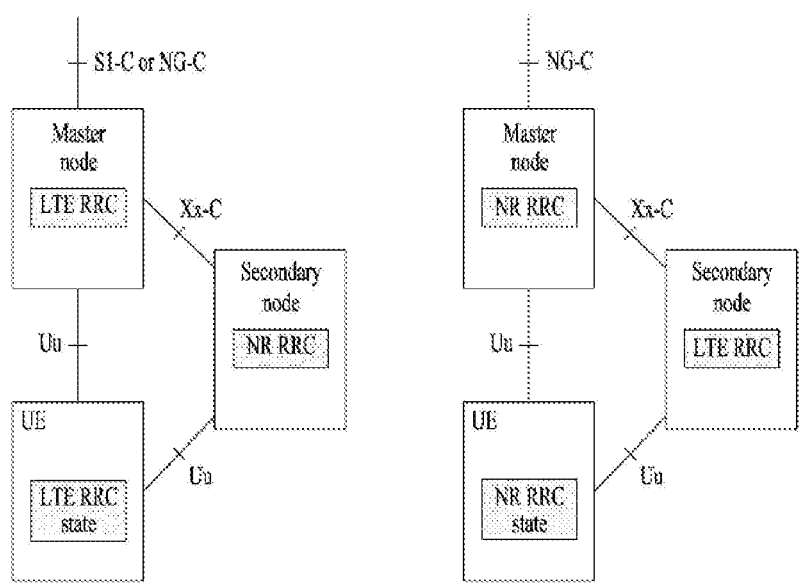

【Figure 9】
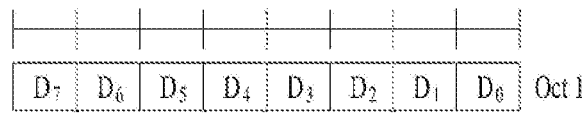
【Figure 10】
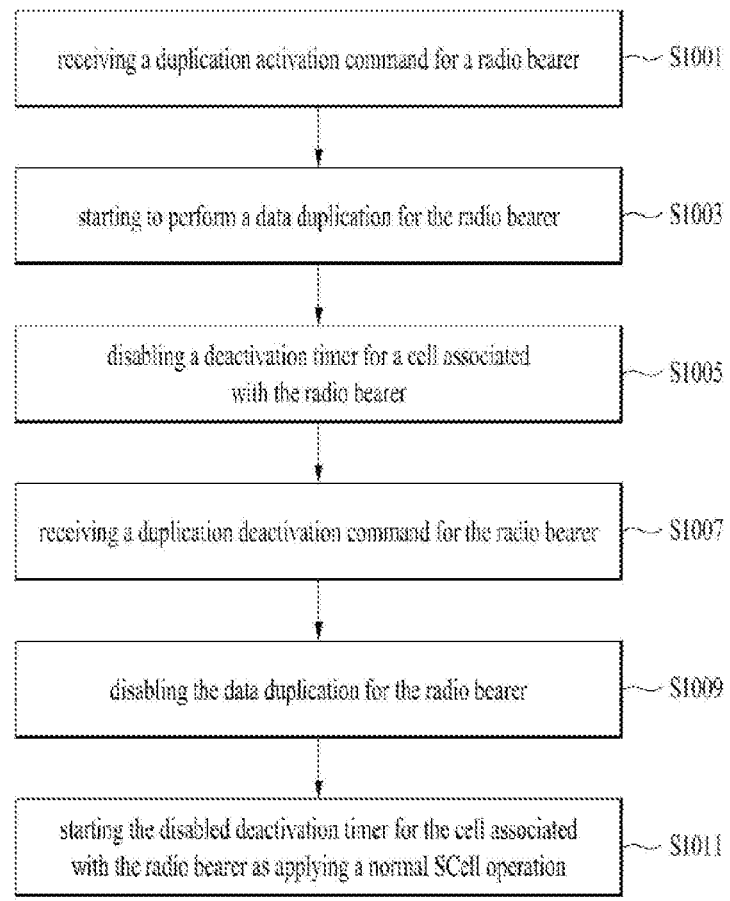

【Figure 11】
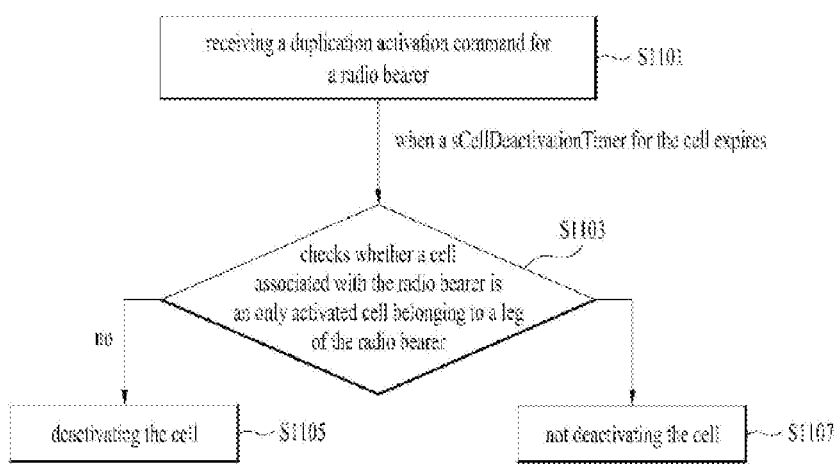

METHOD FOR HANDLING DEACTIVATION FOR A CELL IN WHICH PACKET DUPLICATION IS PERFORMED IN WIRELESS COMMUNICATION SYSTEM AND A DEVICE THEREFOR

CROSS-REFERENCE TO RELATED APPLICATIONS

This application is the National Stage filing under 35 U.S.C. 371 of International Application No. PCT/KR2018/005727, filed on May 18, 2018, which claims the benefit of U.S. Provisional Application No. 62/519,186, filed on Jun. 14, 2017, the contents of which are all hereby incorporated by reference herein in their entirety.

TECHNICAL FIELD

The present invention relates to a wireless communication system and, more particularly, to a method for handling deactivation for a cell in which packet duplication is performed in wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication (NR, New Radio). In addition, a communication system design considering a service/UE sensitive to reliability and latency is being discussed. The introduction of next-generation RAT, which takes into account such Enhanced Mobile BroadBand (eMBB) transmission, and ultra-reliable and low latency communication (URLLC) transmission, is being discussed.

DISCLOSURE

Technical Problem

An object of the present invention devised to solve the problem lies in a method and device for handling deactivation for a cell in which packet duplication is performed in wireless communication system.

In a prior art, if the cell is deactivated, the UE cannot transmit any UL packets on the deactivated cell. If all cells belonging to one leg are deactivated (which is called "leg is deactivated" hereinafter), the UE cannot transmit duplicated packets on the deactivated leg. An SCell can be deactivated implicitly by timer called sCellDeactivationTimer. The timer is started or restarted each time a scheduling PDCCH or an Activation/Deactivation MAC CE is received. When the timer expires, the corresponding SCell is deactivated implicitly, i.e. without informing the gNB about the SCell deactivation. As the UE does not provide SCell activation status information to the gNB, the implicit deactivation is likely to lead to cell status mismatch between UE and gNB.

Consequently, there may be conflict between packet duplication and implicit SCell deactivation. That is, the gNB may activate packet duplication using the cell which was already deactivated implicitly, or the cell is implicitly deactivated while the packet duplication is performed.

The technical problems solved by the present invention are not limited to the above technical problems and those skilled in the art may understand other technical problems from the following description.

Technical Solution

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects

According to this invention, it can resolve conflicts between packet replication and implicit SCell deactivation.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 is a diagram showing a network structure of an Evolved Universal Mobile Telecommunications System (E-UMTS) as an example of a wireless communication system;

FIG. 2a is a block diagram illustrating network structure of an evolved universal mobile telecommunication system (E-UMTS), and FIG. 2b is a block diagram depicting architecture of a typical E-UTRAN and a typical EPC;

FIG. 3 is a diagram showing a control plane and a user plane of a radio interface protocol between a UE and an E-UTRAN based on a 3rd generation partnership project (3GPP) radio access network standard;

FIG. 4a is a block diagram illustrating network structure of NG Radio Access Network (NG-RAN) architecture, and FIG. 4b is a block diagram depicting architecture of functional Split between NG-RAN and 5G Core Network (5GC);

FIG. 5 is a diagram showing a control plane and a user plane of a radio interface protocol between a UE and a NG-RAN based on a 3rd generation partnership project (3GPP) radio access network standard;

FIG. 6 is a block diagram of a communication apparatus according to an embodiment of the present invention;

FIG. 7 is a diagram for signaling of Activation/Deactivation of SCell via a MAC CE;

FIG. 8a is a diagram showing a split bearer via MCG for Dual Connectivity between LTE and NR, FIG. 8b is a diagram showing a split bearer via SCG for Dual Connectivity between LTE and NR, and FIG. 8c is an architecture showing control plane for Dual Connectivity between LTE and NR; and FIG. 9 is a diagram for signaling of Activation/Deactivation of PDCP duplication via a MAC CE; and FIGS. 10 and 11 are conceptual diagrams for handling deactivation for a cell in which packet duplication in wireless communication system according to embodiments of the present invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

FIG. 2a is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2a, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2b is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

FIG. 4a is a block diagram illustrating network structure of NG Radio Access Network (NG-RAN) architecture, and FIG. 4b is a block diagram depicting architecture of functional Split between NG-RAN and 5G Core Network (5GC).

An NG-RAN node is a gNB, providing NR user plane and control plane protocol terminations towards the UE, or an ng-eNB, providing E-UTRA user plane and control plane protocol terminations towards the UE.

The gNBs and ng-eNBs are interconnected with each other by means of the Xn interface. The gNBs and ng-eNBs are also connected by means of the NG interfaces to the 5GC, more specifically to the AMF (Access and Mobility Management Function) by means of the NG-C interface and to the UPF (User Plane Function) by means of the NG-U interface.

The Xn Interface includes Xn user plane (Xn-U), and Xn control plane (Xn-C). The Xn User plane (Xn-U) interface is defined between two NG-RAN nodes. The transport network layer is built on IP transport and GTP-U is used on top of UDP/IP to carry the user plane PDUs. Xn-U provides non-guaranteed delivery of user plane PDUs and supports the following functions: i) Data forwarding, and ii) Flow control. The Xn control plane interface (Xn-C) is defined between two NG-RAN nodes. The transport network layer is built on SCTP on top of IP. The application layer signalling protocol is referred to as XnAP (Xn Application Protocol). The SCTP layer provides the guaranteed delivery of application layer messages. In the transport IP layer point-to-point transmission is used to deliver the signalling PDUs. The Xn-C interface supports the following functions: i) Xn interface management, ii) UE mobility management, including context transfer and RAN paging, and iii) Dual connectivity.

The NG Interface includes NG User Plane (NG-U) and NG Control Plane (NG-C). The NG user plane interface (NG-U) is defined between the NG-RAN node and the UPF. The transport network layer is built on IP transport and GTP-U is used on top of UDP/IP to carry the user plane PDUs between the NG-RAN node and the UPF. NG-U provides non-guaranteed delivery of user plane PDUs between the NG-RAN node and the UPF.

The NG control plane interface (NG-C) is defined between the NG-RAN node and the AMF. The transport network layer is built on IP transport. For the reliable transport of signalling messages, SCTP is added on top of IP. The application layer signalling protocol is referred to as NGAP (NG Application Protocol). The SCTP layer provides guaranteed delivery of application layer messages. In the transport, IP layer point-to-point transmission is used to deliver the signalling PDUs.

NG-C provides the following functions: i) NG interface management, ii) UE context management, iii) UE mobility management, iv) Configuration Transfer, and v) Warning Message Transmission.

The gNB and ng-eNB host the following functions: i) Functions for Radio Resource Management: Radio Bearer Control, Radio Admission Control, Connection Mobility Control, Dynamic allocation of resources to UEs in both uplink and downlink (scheduling), ii) IP header compression, encryption and integrity protection of data, iii) Selection of an AMF at UE attachment when no routing to an AMF can be determined from the information provided by the UE, iv) Routing of User Plane data towards UPF(s), v) Routing of Control Plane information towards AMF, vi) Connection setup and release, vii) Scheduling and transmission of paging messages (originated from the AMF), viii) Scheduling and transmission of system broadcast information (originated from the AMF or O&M), ix) Measurement and measurement reporting configuration for mobility and scheduling, x) Transport level packet marking in the uplink, xi) Session Management, xii) Support of Network Slicing, and xiii) QoS Flow management and mapping to data radio bearers. The Access and Mobility Management Function (AMF) hosts the following main functions: i) NAS signalling termination, ii) NAS signalling security, iii) AS Security control, iv) Inter CN node signalling for mobility between 3GPP access networks, v) Idle mode UE Reachability (including control and execution of paging retransmission), vi) Registration Area management, vii) Support of intra-system and inter-system mobility, viii) Access Authentication, ix) Mobility management control (subscription and policies), x) Support of Network Slicing, and xi) SMF selection.

The User Plane Function (UPF) hosts the following main functions: i) Anchor point for Intra-/Inter-RAT mobility (when applicable), ii) External PDU session point of interconnect to Data Network, iii) Packet inspection and User plane part of Policy rule enforcement, iv) Traffic usage reporting, v) Uplink classifier to support routing traffic flows to a data network, vi) QoS handling for user plane, e.g. packet filtering, gating, UL/DL rate enforcement, and vii) Uplink Traffic verification (SDF to QoS flow mapping).

The Session Management function (SMF) hosts the following main functions: i) Session Management, ii) UE IP address allocation and management, iii) Selection and control of UP function, iv) Configures traffic steering at UPF to route traffic to proper destination, v) Control part of policy enforcement and QoS, vi) Downlink Data Notification.

FIG. 5 is a diagram showing a control plane and a user plane of a radio interface protocol between a UE and a NG-RAN based on a 3rd generation partnership project (3GPP) radio access network standard.

The user plane protocol stack contains Phy, MAC, RLC, PDCP and SDAP (Service Data Adaptation Protocol) which is newly introduced to support 5G QoS model.

The main services and functions of SDAP entity include i) Mapping between a QoS flow and a data radio bearer, and ii) Marking QoS flow ID (QFI) in both DL and UL packets. A single protocol entity of SDAP is configured for each individual PDU session.

At the reception of an SDAP SDU from upper layer for a QoS flow, the transmitting SDAP entity may map the SDAP SDU to the default DRB if there is no stored QoS flow to DRB mapping rule for the QoS flow. If there is a stored QoS flow to DRB mapping rule for the QoS flow, the SDAP entity may map the SDAP SDU to the DRB according to the stored QoS flow to DRB mapping rule. And the SDAP entity may construct the SDAP PDU and deliver the constructed SDAP PDU to the lower layers.

FIG. 6 is a block diagram of a communication apparatus according to an embodiment of the present invention.

The apparatus shown in FIG. 6 can be a user equipment (UE) and/or eNB or gNB adapted to perform the above mechanism, but it can be any apparatus for performing the same operation.

As shown in FIG. 6, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 6 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 6 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

FIG. 7 is a diagram for signaling of Activation/Deactivation of SCell via a MAC CE.

If the MAC entity is configured with one or more SCells, the network may activate and deactivate the configured SCells. Upon configuration of an SCell, the SCell is deactivated. The Special Cell (SpCell) is always activated. The SpCell refers to the PCell of the MCG or the PSCell of the SCG for dual connectivity, and otherwise the term Special Cell refers to the PCell. A Special Cell supports PUCCH transmission and contention based Random Access.

The network activates and deactivates the SCell(s) by sending the Activation/Deactivation MAC control element described in FIG. 7. Furthermore, the MAC entity maintains a sCellDeactivationTimer timer per configured SCell (except the SCell configured with PUCCH, if any) and deactivates the associated SCell upon its expiry. The same initial timer value applies to each instance of the sCellDeactivationTimer and it is configured by RRC. The configured SCells are initially deactivated upon addition and after a handover. The configured SCG SCells are initially deactivated after a SCG change.

If an SCell Activation/Deactivation MAC CE is received activating the SCell, the UE activates the SCell, and applies normal SCell operation (e.g, SRS transmissions on the SCell, CSI reporting for the SCell, PDCCH monitoring on the SCell, PDCCH monitoring for the SCell, PUCCH transmissions on the SCell, if configured). And the UE starts or restarts the sCellDeactivationTimer associated with the SCell when the SCell Activation/Deactivation MAC CE was received, and triggers PHR.

If an SCell Activation/Deactivation MAC CE is received deactivating the SCell, or the sCellDeactivationTimer associated with the activated SCell expires, the UE deactivates the SCell, stops the sCellDeactivationTimer associated with the SCell, and flushes all HARQ buffers associated with the SCell.

If PDCCH on the activated SCell indicates an uplink grant or downlink assignment, or if PDCCH on the Serving Cell scheduling the activated SCell indicates an uplink grant or a downlink assignment for the activated SCell, the UE restarts the sCellDeactivationTimer associated with the SCell.

If the SCell is deactivated, the UE does not transmit SRS on the SCell, report CQI/PMI/RI/PTI/CRI for the SCell, transmit on UL-SCH on the SCell, transmit on RACH on the SCell, monitor the PDCCH on the SCell, monitor the PDCCH for the SCell, transmit PUCCH on the S Cell.

The Activation/Deactivation MAC control element of one octet is identified by a MAC PDU subheader with LCID as specified in table 1 for LTE or table 2 for NR. It has a fixed size and consists of a single octet containing seven C-fields and one R-field. The Activation/Deactivation MAC control element with one octet is defined as follows (FIG. 7a).

The Activation/Deactivation MAC control element of four octets is identified by a MAC PDU subheader with LCID as specified in table 1 for LTE or table 2 for NR. It has a fixed size and consists of a four octets containing 31 C-fields and one R-field. The Activation/Deactivation MAC control element of four octets is defined as follows (FIG. 7b).

For the case with no serving cell with a ServCellIndex larger than 7, Activation/Deactivation MAC control element of one octet is applied, otherwise Activation/Deactivation MAC control element of four octets is applied.

If there is an SCell configured with SCellIndex i, Ci field indicates the activation/deactivation status of the SCell with SCellIndex i, else the MAC entity shall ignore the Ci field. The Ci field is set to "1" to indicate that the SCell with SCellIndex i shall be activated. The Ci field is set to "0" to indicate that the SCell with SCellIndex i shall be deactivated.

TABLE 1

| Index | LCID value |
|---|---|
| 00000 | CCCH |
| 00001-01010 | Identity of the logical channel |
| 01011-11001 | Reserved |
| 11010 | Long DRX Command |
| 11011 | Activation/Deactivation |
| 11100 | UE Contention Resolution Identity |
| 11101 | Timing Advance Command |
| 11110 | DRX Command |
| 11111 | Padding |

TABLE 2

| Index | LCID values |
|---|---|
| 000000 | CCCH |
| 000001-100000 | Identity of the logical channel |
| 100001-101111 | Reserved |
| 110000 | SP ZP CSI-RS Resource Set Activation/Deactivation |
| 110001 | PUCCH spatial relation Activation/Deactivation |
| 110010 | SP SRS Activation/Deactivation |
| 110011 | SP CSI reporting on PUCCH Activation/Deactivation |
| 110100 | TCI State Indication for UE-specific PDCCH |
| 110101 | TCI States Activation/Deactivation for UE-specific PDSCH |
| 110110 | Aperiodic CSI Trigger State Subselection |
| 110111 | SP CSI-RS/CSI-IM Resource Set Activation/Deactivation |
| 111000 | Duplication Activation/Deactivation |
| 111001 | SCell Activation/Deactivation (4 octet) |
| 111010 | SCell Activation/Deactivation (1 octet) |
| 111011 | Long DRX Command |
| 111100 | DRX Command |
| 111101 | Timing Advance Command |
| 111110 | UE Contention Resolution Identity |
| 111111 | Padding |

FIG. 8a is a diagram showing a split bearer via MCG for Dual Connectivity between LTE and NR, FIG. 8b is a diagram showing a split bearer via SCG for Dual Connectivity between LTE and NR, and FIG. 8c is an architecture showing control plane for Dual Connectivity between LTE and NR.

In DC, the configured set of serving cells for a UE consists of two subsets: the Master Cell Group (MCG) containing the serving cells of the MeNB, and the Secondary Cell Group (SCG) containing the serving cells of the SeNB.

When a UE is configured with CA in the MCG, the same principles as a legacy Carrier Aggregation. For SCG, the following principles are applied: i) at least one cell in SCG has a configured UL CC and one of them, named Primary SCell (PSCell), is configured with PUCCH resources; ii) when SCG is configured, there is always at least one SCG bearer or one Split bearer; iii) Upon detection of a physical layer problem or a random access problem on PSCell, or the maximum number of RLC retransmissions has been reached associated with the SCG, or upon detection of an access problem on PSCell (T307 expiry) during SCG change, or when exceeding the maximum transmission timing difference between CGs.

For Dual Connectivity operation the term Special Cell refers to the PCell of the MCG or the PSCell of the SCG depending on if the MAC entity is associated to the MCG or the SCG, respectively. Otherwise the term Special Cell refers to the PCell. A Special Cell supports PUCCH transmission and contention based Random Access.

In DC between LTE and NR (i.e. EN-DC), the secondary node owns its radio resources and is primary responsible for allocating radio resources of it cells. To enable this, some coordination is required between the master node and the secondary node no matter whether the master RAT is LTE and the secondary RAT is NR, or vice versa.

The following RRC functions are at least relevant when (re)configuring secondary node cells to the UE in coordination with the master node; i) common radio resource configurations on secondary node cells, ii) dedicated radio resource configurations on secondary node cells; and iii) measurement and mobility control for secondary node cells.

When DC between LTE and NR is configured for a UE, the UE has a single RRC state machine based on the master node RAT. In this operation, single control plane connection is established towards CN. With these principles, FIG. 6(c) illustrates the control plane architectures for DC between LTE and NR. Each node has its own RRC entity which can generate RRC PDUs and inter-node PDUs using ASN.1. RRC PDUs and inter-node PDUs generated by the secondary node are embedded with RRC PDUs generated by the master node which are transported via the master node to the UE for the first configuration, and for the secondary node RRC reconfiguration requiring the master node RRC reconfiguration and vice versa. The master node needs not to modify or add the UE configurations for the secondary node.

The UE can be configured to establish an SRB in Secondary Cell Group (SCG) to enable RRC Protocol Data Units (PDUs) for the secondary node to be sent directly between the UE and the secondary node. RRC PDUs for the secondary node can be transported directly to the UE for the secondary node RRC reconfiguration not requiring any coordination with the master node. Alternatively, it can be delivered embedded within RRC PDUs generated by the master node, which is up to the network implementation. Measurement reporting for mobility within the secondary node can be done directly from the UE to the secondary node if an SCG SRB is configured. Detail rules for the UE to select the transmission path for a UL RRC message are to be defined in the normative work. Support of the direct RRC PDU transmission between the UE and the secondary node does not imply that the UE has to do any reordering of RRC messages.

Split SRB is supported for DC between LTE and NR no matter which RAT is the master. In other words, C-plane packet duplication is supported in LTE/NR PDCP.

For a UE supporting both LTE and NR, the UE reports its capability information for both LTE and NR respectively, which are independent with each other. In other words, a node of one RAT needs not to look at and not to use the capabilities of the other RAT. In case where the secondary node is NR, gNB can format NR RRC PDUs for the UE configuration. Nonetheless, this principle does not preclude that the capabilities of one RAT might contain some information related to the other RAT, e.g. at least inter-RAT measurement capabilities.

In addition, if the UE supports DC between LTE and NR, the following principles are additionally taken into account:
1. LTE capability changes;
   include information related to inter-RAT measurements for NR.
   include support of DC between LTE and NR.
2. NR capability reporting supports independent capability reporting in accordance with the principle described in this sub-clause.
3. Capability dependency between LTE and NR.
   Type I capabilities: The use of the capability is isolated to the RAT.
   Type II capabilities: The use of the capability in one RAT has impacts to the other RAT but is not understood by the NW side of the other RAT.
   Type III capabilities: The use of the capability in one RAT has impacts to the other RAT and is understood by the NW side of the other RAT.

For Type I capabilities, no coordination between LTE and NR is required. The secondary RAT specific capabilities are merely forwarded by the master node to the secondary node, following the baseline DC within LTE. Some capabilities (e.g. RF capability) are coordinated using Xx/Xn and involve a reconfiguration of the UE. The configuration of the UE does not exceed its capabilities. Some capabilities (e.g. buffer size) are coordinated using Xx/Xn and will not involve a reconfiguration of the UE. In this case, the ongoing operation of the network does not exceed the UE capabilities.

For the UE capabilities requiring coordination between LTE and NR, only two nodes (i.e. one eNB and one gNB) need to be involved. Nevertheless, the forward compatibility towards multiple node connectivity can be considered as well. It is up to the master node to decide on how to resolve the dependency between LTE and NR. The secondary node can initiate the re-negotiation of the UE capability. Upon receiving the re-negotiation request from the secondary node, it is up to the master node to make the final decision.

For DC between LTE and NR where MCG comprises LTE cell(s) and SCG comprises NR cell(s), the gNB as the secondary node is not required to broadcast system information other than for radio frame timing and SFN. In this case, system information (for initial configuration) is provided for the UE by dedicated RRC signaling via LTE eNB as the master node. The UE acquires, at least, radio frame timing and SFN of SCG from the NR-PSS/SSS and PBCH of NR Primary SCell (PSCell).

For DC between LTE and NR where MCG comprises NR cell(s) and SCG comprises LTE cell(s), system information (for initial configuration) is provided for the UE by dedicated RRC signaling via NR gNB as the master node. In this case, the UE acquires radio frame timing and SFN of SCG from PSS/SSS and MIB on LTE PSCell.

FIG. 9 is a diagram for signaling of Activation/Deactivation of PDCP duplication via a MAC CE.

If one or more DRBs are configured with PDCP duplication, the network may activate and deactivate the PDCP duplication for the configured DRB(s).

The PDCP duplication for the configured DRB(s) is activated and deactivated by receiving the Duplication Activation/Deactivation MAC CE described in FIG. 9.

If a Duplication Activation/Deactivation MAC CE for each DRB configured with duplication is received activating the PDCP duplication of the DRB, the UE indicates the activation of PDCP duplication of the DRB to upper layers, and applies the allowedServingCells to the logical channels of the DRB.

If a Duplication Activation/Deactivation MAC CE for each DRB configured with duplication is received deactivating the PDCP duplication of the DRB, the UE indicates the deactivation of PDCP duplication of the DRB to upper layers, and doesn't apply the allowedServingCells to the logical channels of the DRB.

The Duplication Activation/Deactivation MAC CE of one octet is identified by a MAC PDU subheader with LCID as specified in Table 3. It has a fixed size and consists of a single octet containing eight D-fields. The Duplication Activation/Deactivation MAC CE is defined as in FIG. 8.

Di field indicates the activation/deactivation status of the PDCP duplication of DRB i where i is the ascending order of DRB IDs configured with duplication. The Di field is set to one to indicate that the PDCP duplication of DRB i shall be activated. The Di field is set to zero to indicate that the PDCP duplication of DRB i shall be deactivated.

TABLE 3

| Index | LCID values |
| --- | --- |
| 000000 | CCCH |
| 000001-100000 | Identity of the logical channel |
| 100001-101111 | Reserved |
| 110000 | SP ZP CSI-RS Resource Set Activation/Deactivation |
| 110001 | PUCCH spatial relation Activation/Deactivation |
| 110010 | SP SRS Activation/Deactivation |
| 110011 | SP CSI reporting on PUCCH Activation/Deactivation |
| 110100 | TCI State Indication for UE-specific PDCCH |
| 110101 | TCI States Activation/Deactivation for UE-specific PDSCH |
| 110110 | Aperiodic CSI Trigger State Subselection |
| 110111 | SP CSI-RS ICSI-IM Resource Set Activation/Deactivation |
| 111000 | Duplication Activation/Deactivation |
| 111001 | SCell Activation/Deactivation (4 octet) |
| 111010 | SCell Activation/Deactivation (1 octet) |
| 111011 | Long DRX Command |
| 111100 | DRX Command |
| 111101 | Timing Advance Command |
| 111110 | UE Contention Resolution Identity |
| 111111 | Padding |

Regarding Activation/Deactivation of PDCP duplication, there are several issues in this area.

First issue is whether the packet duplication should be supported in EN-DC. For EN-DC with NR master, the PDCP is a NR PDCP, and the packet duplication is agreed to be supported. However, for EN-DC with LTE master, the PDCP is a LTE PDCP, and we have to discuss whether it can be supported. For downlink, there is no problem to support this feature, because the LTE PDCP already implements duplication elimination function. As long as the LTE PDCP in the master eNB duplicates PDCP PDUs to LTE RLC and NR RLC, there is no problem to support this feature in the UE side. It's all up to eNB implementation. However, for uplink, to support packet duplication, the LTE PDCP has to be upgraded in the UE.

Second issue is whether the packet duplication function is mandatory for NR PDCP. The packet duplication is required only for special cases such as URLLC transmission or during handover. As it is not always required, it does not have to be mandatorily supported. Whether to support packet duplication function should be configured per PDCP depending on radio bearer characteristics.

Even if a radio bearer is configured to support packet duplication, the PDCP transmitter does not have to perform packet duplication for all PDCP PDUs. As the packet duplication is useful only at special conditions e.g. bad radio conditions, important packet transmission, etc., it is desirable to perform packet duplication only when it is really needed. The UE may decide to enable/disable packet duplication function by its own, or the gNB may command the UE to turn on/off the duplication function.

As per agreement, when the packet duplication is activated, the PDCP entity of a Duplicate RB duplicates a PDCP PDU to two different RLC entities, and each RLC entity transmits the PDCP PDU to corresponding cell.

However, if the cell is deactivated, the UE cannot transmit any UL packets on the deactivated cell. If all cells belonging to one leg are deactivated (which is called "leg is deactivated" hereinafter), the UE cannot transmit duplicated packets on the deactivated leg.

An SCell can be deactivated implicitly by timer called sCellDeactivationTimer. The timer is started or restarted each time a scheduling PDCCH or an A/D MAC CE is received. When the timer expires, the corresponding SCell is deactivated implicitly, i.e. without informing the gNB about the SCell deactivation. As the UE does not provide SCell activation status information to the gNB, the implicit deactivation is likely to lead to cell status mismatch between UE and gNB.

Consequently, there may be conflict between packet duplication and implicit SCell deactivation. That is, the gNB may activate packet duplication using the cell which was already deactivated implicitly, or the cell is implicitly deactivated while the packet duplication is performed.

There are two cases where collisions occur. One is that packet duplication is activated while the cell is in deactivated state (case 1) and another is that the cell is implicitly deactivated while the packet duplication is activated (case 2).

In case 1, the UE may activate cell(s) belonging to the deactivated leg, when the UE receives a MAC CE activating packet duplication. In this case, with cell activation by packet duplication activation, there would be no mismatch of cell status between UE and gNB. Moreover, this solution is beneficial in that it can reduce signaling overhead by not sending a Activation MAC CE before Duplication MAC CE.

Meanwhile, while the packet duplication is activated, if the sCellDeactivationTimer for the cell expires, and if this cell is the only activated cell belonging to the leg (case 2), the UE behavior needs to be discussed.

FIG. 10 is a conceptual diagram for handling deactivation for a cell in which packet duplication in wireless communication system according to embodiments of the present invention.

When the UE receives a duplication activation command for a radio bearer (S1001), the UE starts to perform a data duplication for the radio bearer according to the duplication activation command (S1003).

While performing the data duplication for the radio bearer, the UE disables a deactivation timer for a cell associated with the radio bearer (S1005).

Since the UE disables a deactivation timer for a cell associated with the radio bearer, when the UE receives the duplication activation command MAC CE, there would be no mismatch of cell status between UE and gNB. Moreover, this solution is also beneficial in that it can reduce signaling overhead by not sending an activation MAC CE before the duplication activation MAC CE.

When the UE receives a duplication deactivation command for the radio bearer (S1007), the UE disables the data duplication for the radio bearer when the duplication deactivation command is received (S1009) and starts the disabled deactivation timer for the cell associated with the radio bearer as applying a normal SCell operation (S1011).

Preferably, the radio bearer is a split bearer comprising a PDCP entity, two RLC entities, and two MAC entities, and the data duplication is for PDCP duplication.

According to this invention, when the packet duplication is activated, the UE does not apply sCellDeactivationTimer for the cell used for packet duplication. That is, by receiving the duplication activation MAC CE, the UE can recognize that that UE does not deactivate a corresponding cell, without any additional signal, thus the possibility to implicit deactivation of the cell could be removed.

FIG. 11 is a conceptual diagram for handling deactivation for a cell in which packet duplication in wireless communication system according to embodiments of the present invention.

This option is that the UE does not deactivate the cell if packet duplication is activated and the cell is the only activated cell belonging to the leg. If there are other activated cells belonging to the leg, the UE deactivates the cell.

For this, when the UE receives a duplication activation command for a radio bearer (S1101), the UE checks whether a cell associated with the radio bearer is an only activated cell belonging to a leg of the radio bearer, when a sCellDeactivationTimer for the cell expires (S1103).

If there are other activated cells belonging to the leg, the UE deactivates the cell (S1105). And the UE does not deactivate the cell if the cell is the only activated cell belonging to the leg (S1107).

However, in case of this method, the UE has to check every cell status before deactivating packet duplication. It may be quite complex and not robust mechanism.

In addition to the above mentioned options, the UE can keep performing packet duplication but does not transmit the duplicated packet on the deactivated leg until the deactivated leg is activated. In this case, the UE stores the duplicated packets that will be transmitted to the deactivated leg in the PDCP and/or RLC buffer. In this case, it may be feasible because implicit SCell deactivation may not happen if there is large amount of data. The gNB would keep scheduling on the SCell, and the timer would not expire. Only if there is small amount of data, and a scheduling PDCCH is lost, the timer may expire. However, in this case, there is not much data in the buffer, so the buffer overflow problem may not be severe.

In this sense, the above-mentioned options (procedure for FIG. 10 or 11) can be considered as the buffer overflow is a real issue.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE and NR system, the present invention is applicable to a variety of wireless communication systems in addition to the 3GPP LTE and NR system.

The invention claimed is:

1. A method for a User Equipment (UE) operating in a wireless communication system via a plurality of cells, the plurality of cells including a Secondary Cell (SCell) associated with a radio bearer and Special Cells (SpCells) including a Primary Cell (PCell) and a Primary SCell (PSCell), the method comprising:
configuring a deactivation timer,
wherein the deactivation timer is configured for deactivating the SCell associated with the radio bearer based on the deactivation timer expiring, and
wherein the SpCells including the PCell and the PSCell are not deactivated by the deactivation timer;
disabling the deactivation timer based on a Packet Data Convergence Protocol (PDCP) data duplication for the radio bearer being activated,
wherein the SCell is not deactivated based on the deactivation timer while the deactivation timer is disabled; and
starting the deactivation timer based on the PDCP data duplication for the radio bearer being deactivated, wherein the SCell is deactivated based on the deactivation timer expiring.

2. The method according to claim 1, wherein the PDCP data duplication is activated based on a duplication activation command is received, and the PDCP data duplication is deactivated based on a duplication deactivation command is received.

3. The method according to claim 1, wherein the duplication activation command and duplication deactivation command are received via Medium Access Control (MAC) Control Elements (CEs).

4. The method according to claim 1, wherein the radio bearer is a split bearer comprising a Packer Data Convergence Protocol (PDCP) entity, two Radio Link Control (RLC) entities, and two Medium Access Control (MAC) entities, and the data duplication is for PDCP duplication.

5. A User Equipment (UE) for operating in a wireless communication system via a plurality of cells, the plurality of cells including a Secondary Cell (SCell) associated with a radio bearer and Special Cells (SpCells) including a Primary Cell (PCell) and a Primary SCell (PSCell), the UE comprising:
 a Radio Frequency (RF) module including a transceiver; and
 a processor operably coupled with the RF module and configured to:
 configure a deactivation timer,
 wherein the deactivation timer is configured for deactivating the SCell associated with the radio bearer based on the deactivation timer expiring, and
 wherein the SpCells including the PCell and the PSCell are not deactivated by the deactivation timer;
 disable the deactivation timer based on a Packet Data Convergence Protocol (PDCP) data duplication for the radio bearer being activated,
 wherein the SCell is not deactivated based on the deactivation timer while the deactivation timer is disabled; and
 start the deactivation timer based on the PDCP data duplication for the radio bearer being deactivated,
 wherein the SCell is deactivated based on the deactivation timer expiring.

6. The UE according to claim 5, wherein the PDCP data duplication is activated based on a duplication activation command is received, and the PDCP data duplication is deactivated based on a duplication deactivation command is received.

7. The UE according to claim 5, wherein the duplication activation command and duplication deactivation command are received via Medium Access Control (MAC) Control Elements (CEs).

8. The UE according to claim 5, wherein the radio bearer is a split bearer comprising a Packer Data Convergence Protocol (PDCP) entity, two Radio Link Control (RLC) entities, and two Medium Access Control (MAC) entities, and the data duplication is for PDCP duplication.

9. The UE according to claim 5, wherein the UE is capable of communicating with at least one of another UE, a UE related to an autonomous driving vehicle, a base station or a network.

* * * * *